(12) United States Patent
Irving et al.

(10) Patent No.: US 6,522,698 B1
(45) Date of Patent: Feb. 18, 2003

(54) METHOD OF TRANSMITTING AND RECEIVING DATA, SYSTEM AND RECEIVER THEREFOR

(76) Inventors: Clive Russell Irving, 16 The Green, Chesterton, Cambridge CB4 1RP (GB); David John Spreadbury, 21 The Paddock, Harston, Cambridgeshire CB2 5PR (GB); Colin Richard Smithers, 10 Grange Park, Bishop's Stortford, Hertfordshire CM23 2HX (GB); Timothy Charles Mace, 7 Fryth Close, Haverhill, Suffolk CB9 0ED (GB)

( * ) Notice: Subject to any disclaimer, the term of this patent is extended or adjusted under 35 U.S.C. 154(b) by 0 days.

(21) Appl. No.: 09/194,242
(22) PCT Filed: May 28, 1997
(86) PCT No.: PCT/GB97/01444
§ 371 (c)(1),
(2), (4) Date: Nov. 25, 1998
(87) PCT Pub. No.: WO97/45962
PCT Pub. Date: Dec. 4, 1997

(30) Foreign Application Priority Data

May 31, 1996 (GB) .............................................. 9611425

(51) Int. Cl.$^7$ .............................................. H04L 27/10
(52) U.S. Cl. ...................................................... 375/272
(58) Field of Search ................................. 375/272, 130, 375/135, 136, 147, 146, 219, 260, 303, 324

(56) References Cited

U.S. PATENT DOCUMENTS

| | | | | |
|---|---|---|---|---|
| 6,111,911 A | * | 8/2000 | Sanderford, Jr. et al. | ... 375/147 |
| 6,178,197 B1 | * | 1/2001 | Froelich et al. | ............. 375/150 |

FOREIGN PATENT DOCUMENTS

| | | | | |
|---|---|---|---|---|
| EP | 0550146 | 7/1993 | ............ | H04B/1/26 |
| EP | 0583522 | 2/1994 | ............ | G01S/5/04 |

* cited by examiner

Primary Examiner—Mohammad H. Ghayour
(74) Attorney, Agent, or Firm—Rines & Rines

(57) ABSTRACT

A method and apparatus for transmitting and receiving data, wherein a narrow band data signal is transmitted at an unknown frequency within a known range of frequencies and received, and, at the receiver, the range of frequencies is divided into plural frequency bands each of width less than the uncertainty in the transmission frequency of the data signal, with the presence of said data signal detected in at least one of said frequency bands and thereupon demodulated.

43 Claims, 4 Drawing Sheets

METHOD OF TRANSMITTING AND RECEIVING DATA, SYSTEM AND RECEIVER THEREFOR

FIELD OF INVENTION

The present invention relates generally to a method of digital communication and to a digital communication system.

BACKGROUND OF INVENTION

The applicant's known vehicle tracking system, which is in use in the United Kingdom, allows the police to track and recover stolen vehicles. In this known system, a small transceiver unit is hidden in a vehicle. The unit is activated by an activation signal to transmit signals when the vehicle is stolen. The activation signal is generated from a network of base stations. Police vehicles are fitted with receivers, which enable them to receive the signals transmitted by the transceiver unit in the stolen vehicle. In this manner, the police can track, locate and recover the vehicle.

Additional and more sophisticated functions could be incorporated in the tracking system if there were a two-way link between the transceiver unit in each vehicle and a base station, usually the nearest base station, with that base station acting additionally as a receiver for receiving data transmitted in signals from the transceiver unit. Such two-way or duplex communication is not possible with the known system because of the disparity in the power available from an on-board transceiver unit and from a base station. In particular, the base stations have transmitters having a power of 25 watts and a range of the order of 30 miles (about 50 km). The on-board transceiver units each have a transmitter whose power is 1 watt and with a maximum range of 1.5 miles (about 2.5 km), which is often not sufficient to reach a base station. It is not possible simply to increase the power of the on-board transmitter units as this would increase their size and their cost, and this is not acceptable to the market.

It is possible to reduce the bandwidth of the transmissions to extend the range of transmissions from the on-board transceiver units. This would have the effect of reducing the speed at which the information is transmitted, but for many applications, such as in a tracking system, such a speed reduction is acceptable. Normally, the use of a reduced bandwidth transmitter unit would increase the cost of each on-board transceiver unit because high accuracy components in the transceiver unit would be required. This is because the uncertainty or error in the transmit carrier frequency must normally be less than the bandwidth of the signal being transmitted in order for the receiver to be able to locate the data. However, the market will not accept units having a significantly higher cost and therefore high accuracy components cannot be used in such a transceiver.

The present invention seeks to increase the range of a transmitter without increasing its size or cost. The present invention further seeks to increase the range of transmission of signals containing data from a transmitter without increasing its size or cost. The present invention has particular application to a vehicle tracking system but can be used in many applications, especially where low cost transmitters are used or required.

In EP-A-0583522 there is disclosed a remote position determination system. The spatial position of a plurality of mobile transceivers can be determined by a base station which receives positioning signals from the mobile transceivers. The mobile transceivers use a spread spectrum frequency-hopped transmission mode, with each mobile transceiver having its own characteristic frequency hopping pattern in order for the base station to be able to identify which mobile transceiver is transmitting on the basis of the particular frequency hopping pattern in the signal received. As the frequency of transmission used by each mobile transceiver is therefore critical to it being properly identified by the base station, it is essential that the base station transmits timing synchronising signals to the mobile transceivers and the mobile transmitters accordingly have to be relatively complex (and therefore expensive) in that they must contain memories and circuits so that the correct frequency and pattern of frequency hopping is transmitted by each mobile transceiver. Furthermore, the signals transmitted by the mobile transceivers are not modulated with and therefore do not contain any data to be transmitted to the base station because the only information used by the base station is the fact that a particular identified mobile transceiver is actually transmitting. There is therefore no two-way communication of data between the base station and the mobile transceivers.

In EP-A-0550146, there is disclosed a digital processor for processing multiple analog signals respectively received from multiple mobile transmitters.

SUMMARY OF INVENTION

According to a first aspect of the present invention there is provided a method of transmitting and receiving data, the method comprising the steps of: transmitting a narrow band data signal at an unknown frequency within a known range of frequencies; receiving the data signal within the known range of frequencies; dividing at a receiver the range of frequencies into plural frequency bands each of width less than the uncertainty in the transmission frequency of the data signal; detecting the presence of said data signal in at least one of said frequency bands; and, demodulating the detected data signal.

The demodulating step preferably includes the step of centring at least one narrow band filter on the detected data signal frequency bands.

The frequency of the or each narrow band filter in the demodulation step is preferably determined in the detection step.

The time of data signals in the narrow frequency bands is preferably determined in the detection step and used in the demodulation step.

In a most preferred embodiment, the step of detecting the presence of data signals in at least one of the frequency bands comprises the step of detecting the presence of a data signal in plural frequency bands, the amplitude of the data signal in each band being compared with a normalised value to determine a quality value of the data signal in each band.

The transmitted data signal preferably includes a flag sequence and a "centre-of-gravity" calculation is preferably performed on the quality values to provide a central frequency and a central time for each flag sequence, the results of the centre-of-gravity calculation being utilised during demodulation of the data signal.

The frequency of the transmitted data signal may be varied between successive transmissions. This ensures that a good signal will be received even if there is line interference at a particular frequency as the subsequent transmission will be at a frequency which is unlikely to be affected by the same interference.

The data signal is preferably transmitted as two sub-channels, the detection and demodulation steps being carried out on each sub-channel, the respective demodulated data signals being weighted and summed according to the quality of the signals determined in the detection steps.

The received signal can include plural narrow band data signals each occupying a distinct portion of the channel, the receiver receiving said narrow band data signals substantially concurrently. This allows the receiver to receive transmissions from several transceiver units substantially concurrently.

Plural demodulation steps may be carried out following each detection step.

An embodiment of the present invention increases the effective range of the transmitter by providing, in effect, narrow band communication between the transmitter and the receiver. This increases the range for the same power, but at some decrease in the rate of data transmission which can be used. As this narrow band communication is provided by the signal processing techniques at the receiver, it is not necessary to provide a more accurate, and therefore more costly, narrow band transmitter.

In an embodiment, the data signals have been modulated at a transmitter by the use of direct FSK (frequency shift keying) modulation.

A data signal preferably comprises a data packet following a flag sequence of bits and the detection step detects the existence of the flag sequence. In a presently preferred embodiment, data signals in individual narrow frequency bands are compared with a wanted flag signal at regular intervals. Accurate timing, frequency and quality information is obtained from these comparisons, allowing the detection step to be optimised.

Preferably, for security of detection, the data packet is transmitted between leading and trailing flag sequences, and the detection step requires the detection of both flag sequences.

Preferably, it is required that both the leading and trailing flag sequences are detected to verify the presence of a data packet. This greatly reduces the possibility of false detections. Furthermore, the frequency and timing information for the demodulation step is determined from the flag sequences. The presence of a flag sequence before and after each data packet enables the frequency and timing to be used during demodulation to be re-measured at regular intervals.

The data signal may have plural data packets separated from each other by flag sequences. Thus, where there are n data packets, there would be n+1 flag sequences in the data signal. The use of flag sequences to provide a means of detecting the presence of data, and to provide frequency and timing information to enable its demodulation, means that external synchronisation between the transmitter unit and a receiver is not required.

In a preferred embodiment, the step of detecting the presence of data signals in individual narrow frequency bands comprises the step of detecting the presence of a flag sequence in plural narrow frequency bands, the amplitude of the flag sequence bits in each band being compared with a normalised value to determine a quality value of the flag sequence bits in each band, the quality values being plotted against frequency and time.

Preferably, a "centre-of-gravity" calculation is performed on the quality values to provide a central frequency and a central time for each flag sequence, the results of the centre-of-gravity calculation being utilised during demodulation of the data signal.

According to a second aspect of the present invention, there is provided apparatus for transmitting and receiving and demodulating transmissions, the apparatus comprising: a transmitter for transmitting a narrow band data signal at an unknown frequency within a known range of frequencies; and, a receiver for receiving the data signal within the known range of frequencies, the receiver having means for dividing the range of frequencies into plural frequency bands each of width less than the uncertainty in the transmission frequency of the data signal; means for detecting the presence of said data signal in at least one of said frequency bands; and, means for demodulating the detected data signal.

According to a third aspect of the present invention there is provided a method of receiving data transmitted as a narrow band data signal at an unknown frequency within a known range of frequencies, the method comprising the steps of: receiving the data signal within the known range of frequencies; dividing at a receiver the range of frequencies into plural frequency bands each of width less than the uncertainty in the transmission frequency of the data signal; detecting the presence of said data signal in at least one of said frequency bands; and, demodulating the detected data signal.

According to a fourth aspect of the present invention there is provided a receiver for receiving and demodulating a data signal transmitted at an unknown frequency within a known range of frequencies, the receiver comprising: means for dividing the range of frequencies into plural frequency bands each of width less than the uncertainty in the transmission frequency of the data signal; means for detecting the presence of said data signal in at least one of said frequency bands; and, means for demodulating the detected data signal.

In a preferred embodiment, said receiver comprises an analogue to digital converter (ADC), and said dividing means comprises a Fast Fourier Transform (FFT).

In an embodiment, the demodulation means comprises filtering means arranged to pass only a central frequency determined by said detecting means.

Preferably, said division, said detection, and said demodulation are performed digitally in a digital signal processor.

The receiver preferably has detection and demodulation means for detecting and demodulating data signals transmitted in two sub-channels, and further preferably comprises adding means for weighting and summing the respective demodulated data signals according to the quality of the signals determined in the detection steps.

By enabling true two-way data communication between a base station (which may be relatively high power and expensive) and a plurality of transceivers (which may be low power and cost), the present invention greatly enhances the value and usefulness of a digital communications system. For example, when a transceiver has been activated by a base station, the transceiver can send a data signal to the base station to acknowledge that it has been activated, thus providing assurance to the base station that the activation signal has been received and saving the base station from having to repeat the signal many times to ensure that it had been received as in the past. A de-activation signal may be sent to the transceiver which can also be acknowledged by the transceiver so that the base station can be confident that the de-activation signal has been received and thus preventing false or erroneous activations from being maintained. Data concerning the status of the transceiver (such as the status of the transceiver unit, its battery voltage, etc.) can be sent to the base station which can therefore continually monitor the status of the transceiver unit. From time to time, the base station can send test signals to each of the transceiver units to ensure that the units are working properly, with the transceiver units being able to respond appropriately; in the prior art vehicle tracking system described above, for example, the only way of testing a transceiver unit was by bringing the vehicle in on a regular basis for servicing and testing each unit by making physical connections to the unit during each service.

The present invention has particular applicability to a vehicle tracking system. Thus, there may be provided a vehicle tracking system having a system or receiver according to any of the aspects described above. There may also be provided a method of transmitting and receiving data or a method of receiving data as described above in a vehicle tracking system.

BRIEF DESCRIPTION OF DRAWINGS

An embodiment of the present invention will now be described by way of example with reference to the 15 accompanying drawings, in which.

PREFERRED EMBODIMENT OF INVENTION

Figure 1:
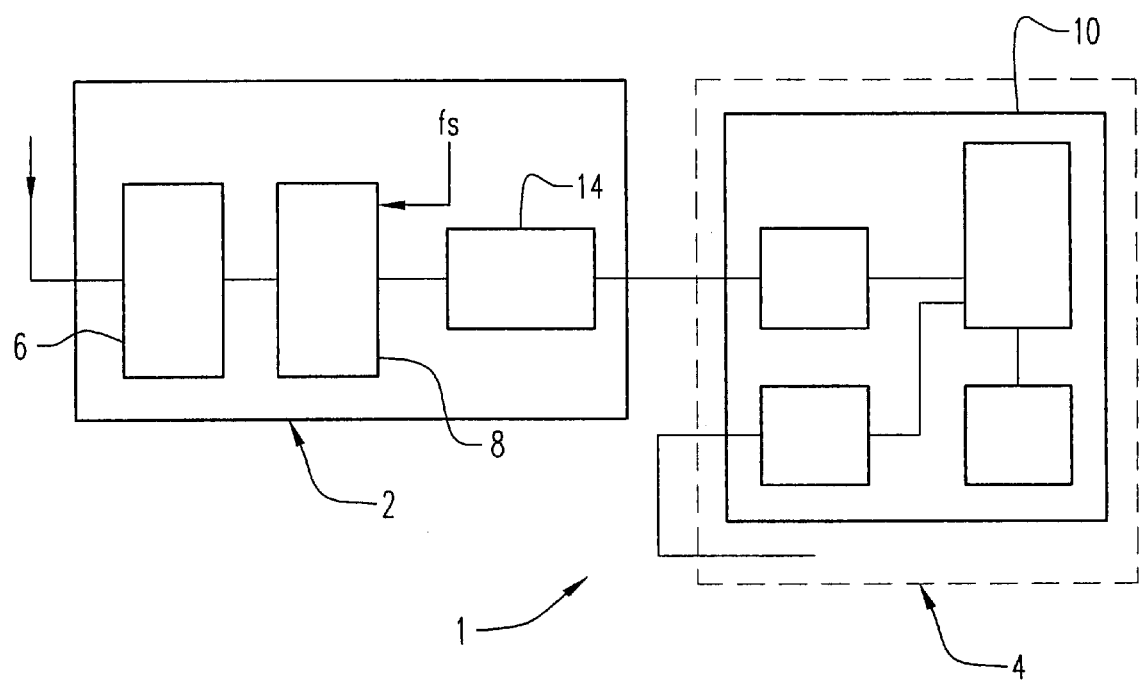
FIG. 1 shows schematically a receiver of a communication system of the invention.

The receiver and telecommunication systems described herein have general application. However, for clarity, the systems and methods are specifically described when used in a tracking system for recovering stolen vehicles. It is to be understood, however, that the invention is not limited to such a tracking system. For example, the present invention may be applied to remote metering of electricity or other utility meters; low data rate telemetry from remote (e.g. non-mains powered) installations such as water reservoirs; from personal or property accident or attack security alarms such as rape alarms, mountain rescue alarms, etc.; security systems for buildings, low-power wireless alarms, connection of building alarms to a national central monitoring system; remote controls for example in a domestic environment such as for electrical appliance control; and non-radio communications system using, for example, signalling via electricity mains supply.

The techniques described in detail below enable a substantially conventional low power transmitter or transceiver unit to be used to provide two-way communication. In particular, in the specific example described, the techniques described in detail below enable a substantially conventional low power transceiver unit to be used to provide two-way communication on-board a vehicle, but with a range increased to be comparable to that of a base station. The range of the transceiver is increased by a reduction in bandwidth by effectively reducing the bandwidth at the receiver only, though the transceiver unit still transmits across the same band. The only modification required at the transmitter unit, therefore, is to reduce the speed of transmission because the system will behave as if, in effect, narrow band transmissions are being made. As will become clear, at the receiver, the channel received is divided into a number of narrow bands from each of which information can be detected and demodulated. The use of a narrow bandwidth at the receiver has the advantage of reducing the effect of noise because, by definition, white noise has a uniform energy per unit of bandwidth.

In the specific example, the power transmitted by the on-board transceiver unit is 25 times smaller than the base station power. The receiver at the base station must provide gain to compensate for this, plus additional gain to accommodate the increased levels of noise and interference. Furthermore, the transmissions can be obscured by other transmissions, for example, from other transmitter units nearer to the base station.

In one implementation, the on-board transceiver unit has a centre carrier frequency in a VHF band with a channel width of 12.5 kHz and transmits at the relatively low power of 1 watt. The data to be transmitted by an individual transceiver unit is modulated onto the carrier signal by frequency shift keying (FSK) with a deviation of ±2.5 kHz and a bit transmission rate of 55.8 bits per second. The FSK modulation with this low data transmission rate produces a spectrum which has the appearance of two narrow band AM spectra, separated by 5 kHz, with one data band inverted with respect to the other because the data being transmitted can, to a large extent, be regarded as being transmitted only at either the higher or at the lower band produced by the FSK process. The upper band is defined to contain the inverted pattern.

Preferably, the centre frequency for the transmission from the transceiver unit is varied slightly ("dithered") on successive message bursts so that if a message happens to be masked by line interference on one frequency of the transmitted data signal, it is likely to get through on the subsequently transmitted data signal. In this respect, the range of centre frequencies is limited to ±250 Hz.

FIG. 1 shows the architecture of one embodiment of the receiver 1 at the base station. The receiver 1 generally comprises an analogue receiver section 2 connected to a signal processing section 4. The receiver 1 preferably has a linear characteristic and it preferably does not have a conventional FM discriminator because otherwise the data may be lost as the data signal level will usually be very much smaller than the noise level.

The analogue receiver section 2 includes a down converter 6 which converts the carrier frequency of the received data signal to an intermediate frequency (IF). The value of IF may be 14 or 15 kHz, for example, which allows the use of a conventional low cost stereo audio analogue to digital converter (ADC) 8 to which the data signal is directly fed by the down converter 6.

Figure 2:
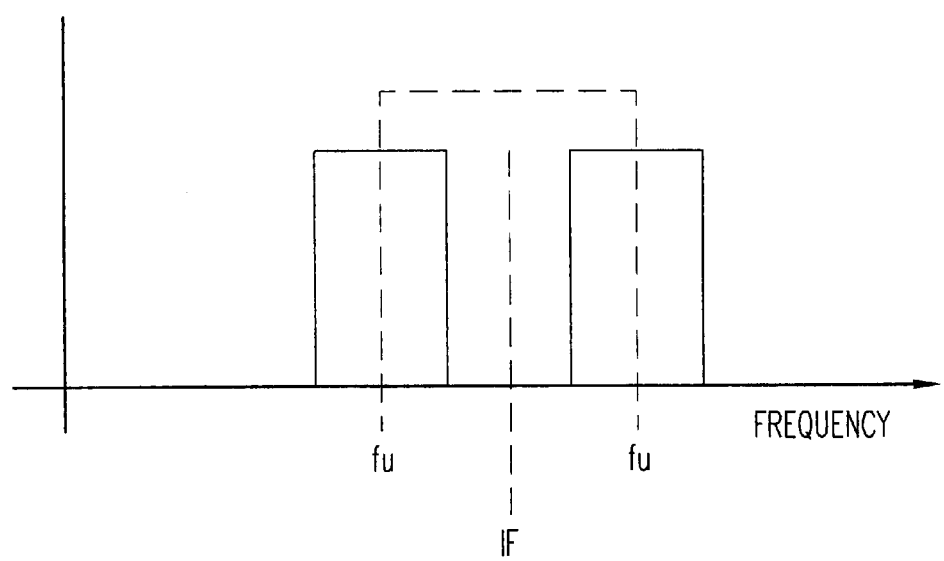
FIG. 2 illustrates the received signal when mixed to an intermediate frequency.

FIG. 2 illustrates the spectrum of the converted data signal which is output by the down converter 6 and before it is digitised by the ADC 8. As can be seen, the converted data signal has a sub-channel on either side of IF, the lower sub-channel having a centre frequency fl and the upper sub-channel having a centre frequency fu which are 5 kHz apart. Each sub-channel or band has a frequency spread of 3.57 kHz in this example.

The converted data signal is fed from the converter 6 into both left and right stereo inputs of the ADC 8 where they are digitised with a sample rate of 57 kHz. As indicated in FIG. 1 and shown more clearly in FIG. 3, the left and right outputs of the ADC 8 are transmitted to a digital signal processor (DSP) 10 in the digital signal processing section 4 via a synchronous serial port 14. These left and right signals are added in the DSP 10 and converted to floating point numerical format as indicated at 101. This addition of the signals serves to cancel out at least some of the noise which is generated in the ADC 8. The resulting values are written to a memory for demodulation later as will be described in more detail below. The DSP 10 can operate on blocks of samples, writing some blocks to memory for example, whilst processing others. This allows communications to be received from several on-board transceivers and acted on substantially simultaneously by a single base station receiver.

The values from section 101 of the DSP 10 are then mixed with two local digital oscillators 102, 103 such that two data sets at different frequencies are produced. The following description relates to the detection steps and, whilst it specifically describes the data set of the upper sub-channel, it will be understood that the same operations are carried out on the data set of the lower sub-channel, preferably concurrently.

The sub-channel is filtered to pass only the desired sub-channel frequency and decimated (i.e. reduced) by a factor of 8 as indicated at 104. This reduces the 256 samples from the ADC 8 to 32 samples and these values are stored with the previous 480 samples in a buffer 105. The data in the buffer 105 are windowed with a predefined shape 106 so that a Fast Fourier Transform (FFT) 107 applied to the data implements an overlapping set of bandpass filters. Each bandpass filter formed thereby has a narrow bandwidth of ±33 Hz and the bandpass filters are overlapped with a separation of 14 Hz.

The FFT is performed once per 256 raw samples from the ADC 8. The middle 256 frequency outputs of the FFT 107 represent the sub-channel, each separated by 14 Hz in respective frequency "bins". For each of the 256 outputs, a goodness-of-fit test is performed, using previous values from previous interrupts, as indicated at 108. The output from the FFT 107 at each frequency is tested against an ideal representation of the known flag sequence; the flag sequence will be described further below with reference to FIG. 5. The output is tested where it would be expected to have energy and where it would be expected to have no energy. A positive goodness-of-fit occurs where the minimum energy at a sample where energy is expected exceeds the maximum energy where no energy is expected. This measure is normalised against the signal strength and termed the "eye" opening.

When a flag sequence is present in the data, eye openings will occur across a number of frequencies since the FFT filter passband width is greater than its output frequency separation. The eye opening will occur across a number of time periods since the data is four times oversampled at this point. Typically, the detection of a flag sequence will occur against three or four time positions. Additionally, a good flag sequence detection is likely to span across up to six frequency bins.

Figure 6:
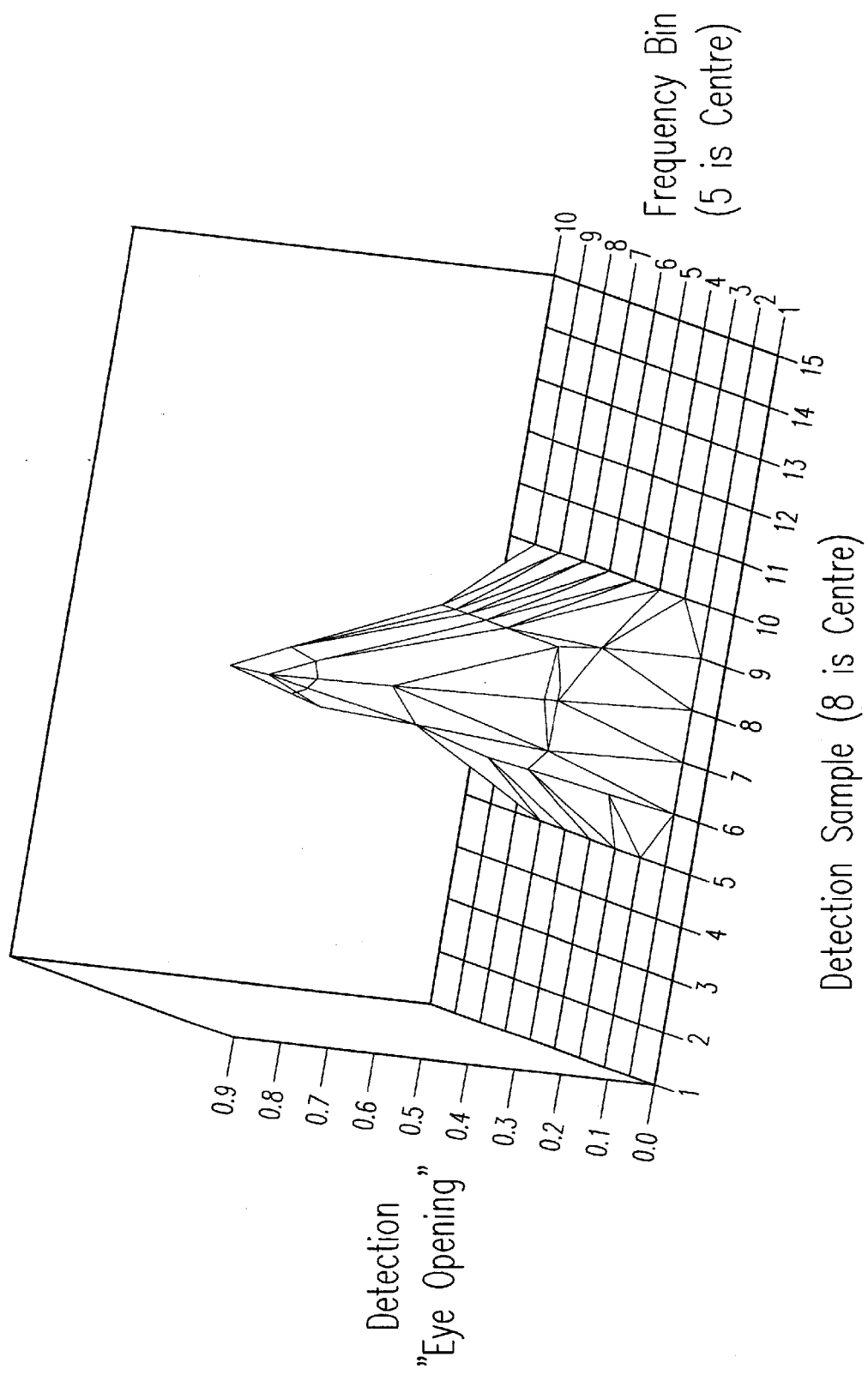
FIG. 6 illustrates a detection "blob" to show a centre-of-gravity calculation.

The presence of a flag sequence will thus cause a peak or "blob" in frequency/time space, which is shown by way of example in FIG. 6. A "centre-of-gravity" algorithm 109 is used to measure the centre of the peak in frequency to a much greater accuracy than the FFT output frequency separation and the symbol time to ⅟₃₂ of a bit. The overall "mass" of the peak is also recorded to give a quality measurement of the peak. This calculation improves the ability to differentiate between real and false signals, and increases the accuracy of the frequency and timing estimates for subsequent demodulation.

Figure 3:
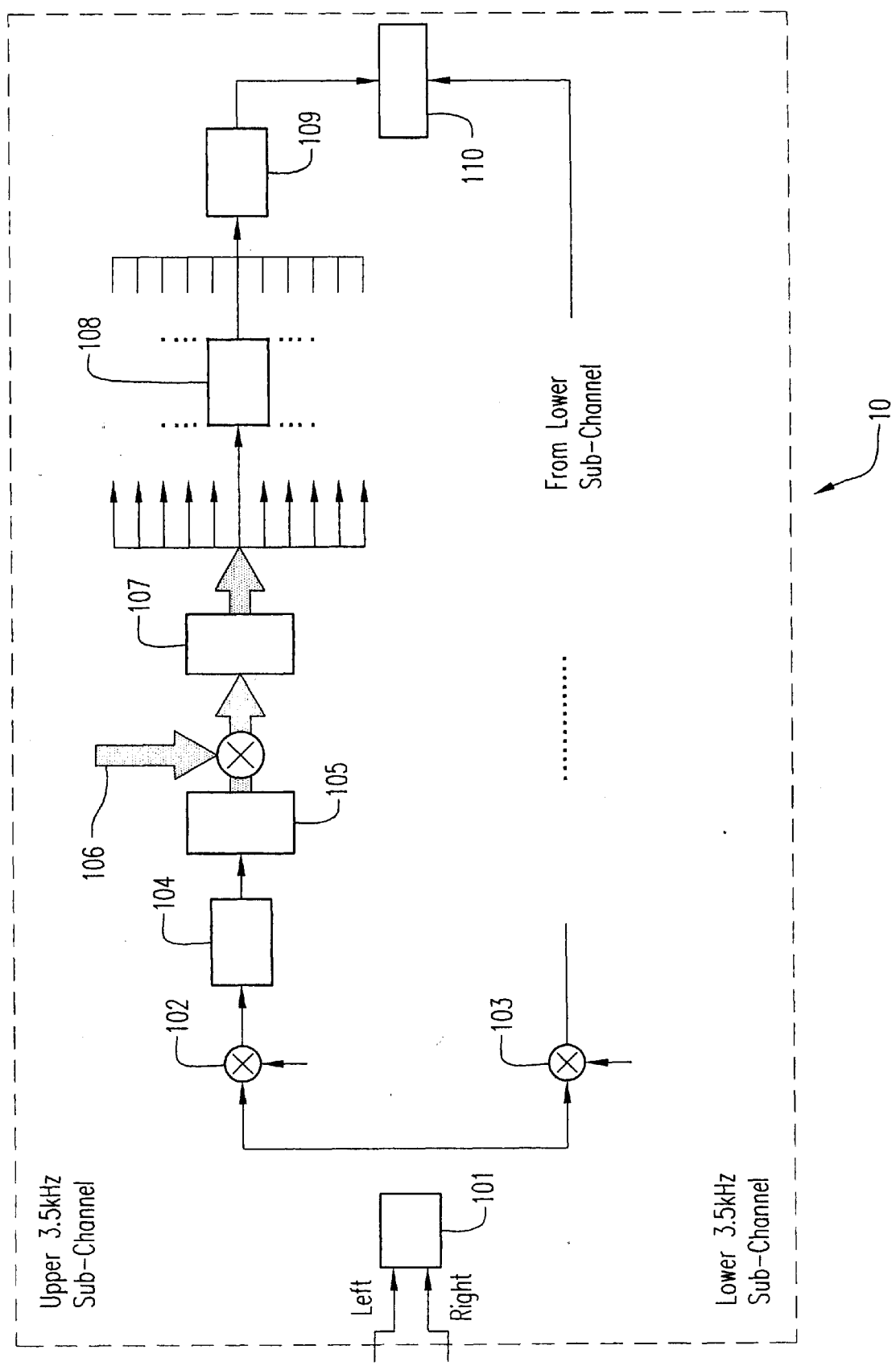
FIG. 3 shows schematically the detection process in the DSP.

These measured parameters are then used to create a new demodulation process as indicated at 110 in FIG. 3. At this stage, any matching peak detected from the lower sub-channel is incorporated with the upper sub-channel peak if the detection times and frequencies are within predetermined limits. However, whilst noise can be reduced by using both the upper and lower sub-channels when possible, the demodulation process does not require that a detection be found in both upper and lower sub-channels and a detection in one sub-channel only is sufficient.

After the detection process has completed, the DSP 10 has sufficient time to perform numerous demodulation processes before the next detection routine has to be executed. These demodulation processes are performed consecutively. A demodulation process lasts for 63 bits of data. Since the detection routine operates every ¼ bit, any one demodulation process will last for 252 interrupts, thereby gradually recovering data.

Figure 4:
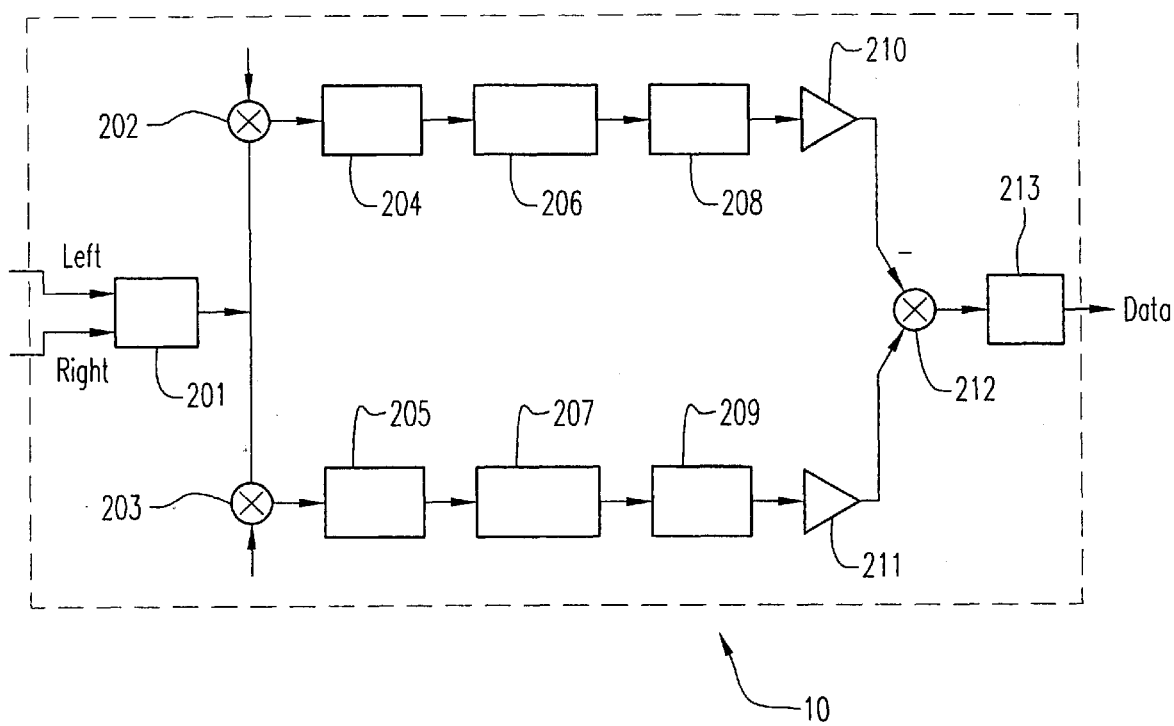
FIG. 4 shows schematically the demodulation process in the DSP.

Referring to FIG. 4, each demodulation process operates on the same raw data as the detection process described with reference to FIG. 3. The demodulation process uses the summed, floated values calculated by the detection at step 101 of FIG. 3; the step indicated by 201 in FIG. 4 is identical to the step indicated by 101 in FIG. 3. A demodulation applies a narrow filter around the wanted signal and reduces the sample rate such that a single bit of data only is produced, and this only 1 in 4 times that the process is run.

In particular, the input set of samples are respectively mixed as indicated at 202 and at 203 such that the wanted signal in the upper sub-channel is at DC and also so that the wanted signal in the lower sub-channel is at DC. This is achieved by mixers 202, 203 whose phase change per sample is calculated exactly from the measured frequencies of the detection process described above.

Once the wanted signals have been mixed to DC, the two data streams can each be passed through low pass filters and the sample rate significantly decimated or reduced as indicated at 204, 205. The bit timing of each signal can then be set to ⅟₃₂ by means of respective variable delay lines 206, 207. The length of this delay line is predetermined from the timing derived from the detection process described above. The data streams are then further low pass filtered and the sample rate reduced as indicated at 208, 209 such that final values are only produced on 1 out of 4 operations of the process. When the values are produced, the upper and lower sub-channel results are respectively combined with weightings derived from the detection process according to the quality of the signals, as indicated at 210 and 211, and then added at 212. A decision is then made as indicated at 213 as to whether the resultant value represents a "1" bit or a "0" bit and the value is tested against a threshold, which is again derived from the detection process.

Individual bits from the demodulation process are assembled into full messages which are then passed on from the DSP 10.

Figure 5:
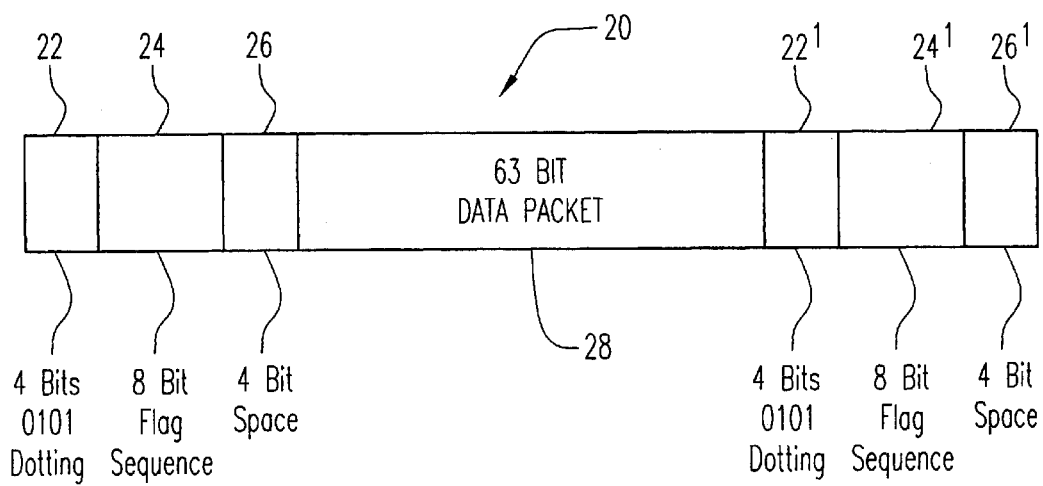
FIG. 5 shows the data signal received by the 30 receiver.

FIG. 5 indicates the structure of a simple message transmitted from an on-board transmitter unit, there being one data packet. As can be seen, each data signal 20 has a 4 bit dotting sequence 22 of 0101, followed by an 8 bit flag sequence 24 which is followed by a 4 bit null or space sequence 26 of 0000. In this example, the 8 bit flag sequence 24 is 10001101. In order to improve performance during detection, the detection algorithm looks for an extended 10 bit sequence commencing with the last 1 of the dotting sequence 22 and ending with the first 0 of the null sequence 26. Thus, the detection algorithm is seeking the 10 bit extended sequence 1100011010. The dotting, flag, and null sequences 22, 24, 26 are followed by a data packet 28 of 63 data bits, and then there are corresponding dotting, flag, and null sequences 22', 24' and 26' following the data packet 28. The trailing sequences are used to validate the presence of the data packet 28 and thus to avoid false detections.

Multiple data packets can be sent by the transceiver on-board the vehicle in a single message. Each data packet is separated by a flag sequence from the next and previous data packet, there being flag sequences at the start and the finish of the message so that each data packet can be properly detected. Thus, if there are n data packets, there are n+1 flag sequences.

In the description given above, reference has been made to specific frequencies and channel sizes. However, it will be appreciated that these are given by way of example only and that alternative values may be utilised as required. Furthermore, it will be appreciated that the hardware and software implementations described are by way of example only and that modifications and variations may be made within the scope of the present invention.

What is claimed is:

1. A method of transmitting and receiving data, the method comprising the steps of:
   transmitting a narrow band data signal at an unknown-frequency-within a known range of frequencies;
   receiving the data signal within the known range of frequencies;
   dividing at a receiver the range of frequencies into plural frequency bands each of width less than the uncertainty in the transmission frequency of the data signal;
   detecting the presence of said data signal in at least one of said frequency bands; and
   demodulating the detected data signal, wherein the demodulating step includes the step of centering at least one narrow band filter on the detected signal frequency bands and wherein the time of data signals in the narrow frequency bands is determined in the detection step and used in the demodulation step.

2. A method according to claim 1, wherein the step of detecting the presence of data signals in at least one of said frequency bands comprises the step of detecting the presence of a data signal in plural frequency bands, the amplitude of the data signal in each band being compared with a normalized value to determine a quality value of the data signal in each band.

3. A method according to claim 2, wherein the transmitted data signal includes a transmitted flag sequence and wherein a "center-of-gravity" calculation is performed on the quality values to provide a central frequency and a central time for each flag sequence, the results of the center-of-gravity calculation being utilized during demodulation of the data signal.

4. A method according to claim 1, wherein the data signal is formed by modulating a carrier by FSK (frequency shift keying).

5. A method according to claim 1, wherein the frequency of the transmitted data signal is varied between successive transmissions.

6. A method of transmitting and receiving data, the method comprising the steps of:
   transmitting a narrow band data signal at an unknown frequency within a known range of frequencies;
   receiving the data signal within the known range of frequencies;
   dividing at a receiver the range of frequencies into plural frequency bands each of width less than the uncertainty in the transmission frequency of the data signal;
   detecting the presence of said data signal in at least one of said frequency bands; and,
   demodulating the detected data signal, wherein the data signal is transmitted as two sub-channels, the detection and demodulation steps being carried out on each sub-channel, the respective demodulated data signals being weighted and summed according to the quality of the signals determined in the detection step.

7. A method according to claim 6, wherein the received signal includes plural narrow band data signals each occupying a distinct portion of the channel, the receiver receiving said narrow band data signals substantially concurrently.

8. A method according to claim 6, wherein plural demodulation steps are carried out following each detection step.

9. A method according to claim 6, wherein the data signal comprises a data packet following a flag sequence of bits and the detection step detects the existence of the flag sequence.

10. A method according to claim 9, wherein individual narrow frequency bands are compared with a wanted flag signal at regular intervals.

11. A method according to claim 9, wherein the data packet is transmitted between leading and trailing flag sequences, and the detection step requires the detection of both flag sequences.

12. A method according to claim 11, wherein it is required that both the leading and trailing flag sequences are detected to verify the presence of a data packet.

13. A method according to claim 9, wherein the data signal has plural data packets separated from each other by flag sequences.

14. A method according to claim 9, wherein the step of detecting the presence of data signals in iindividual narrow frequency bands comprises the step of detecting the presence of a flag sequence in plural narrow frequency bands, the amplitude of the flag sequence bits in each band being compared with a normalised value to determine a quality value of the flag sequence bits in each band, the quality values being plotted against frequency and time.

15. A method according to claim 14, wherein a "centre-of-gravity" calculation is performed on the quality values to provide a central frequency and a central time for each flag sequence, the results of the centre-of-gravity calculation being utilised during demodulation of the data signal.

16. Apparatus for transmitting and receiving and demodulating transmissions, the apparatus comprising:
   a transmitter for transmitting a narrow band data signal at an unknown frequency within a known range of frequencies; and,
   a receiver for receiving the data signal within the known range of frequencies, the receiver having means for dividing the range of frequencies into plural frequency bands each of width less than the uncertainty in the transmission frequency of the data signal; means for detecting the presences of said data signal in at least one of said frequency bands; and means for demodulating the detected data signal, wherein the receiver has detection and demodulation means for detecting and demodulating data signals transmitted in two sub-channels, and further comprising adding means for weighting and summing the respective demodulated data signals according to the quality of the signals determined in the detection steps.

17. Apparatus according to claim 16, wherein the means for detecting the presences of a data signal in plural narrow frequency bands includes means for comparing the amplitude of the data signal in each band with a normalized value to determine a quality value of the data signal in each band.

18. A vehicle tracking apparatus having apparatus according to claim 16.

19. In a vehicle tracking apparatus, a method of transmitting and receiving data according to claim 1.

20. A method of receiving data transmitted as a narrow band data signal at an unknown frequency within a known range of frequencies, the method comprising the steps of:

receiving the data signal within the known range of frequencies;

dividing at a receiver the range of frequencies into plural frequency bands each of width less that the uncertainty in the transmission frequency of the data signal;

detecting the presence of said data signal in at least one of said frequency bands; and, demodulating the detected data signal, wherein the transmitted data signal includes a transmitted flag sequence and a "center-of-gravity" calculation is performed on the quality values to provide a central frequency and a central time for each flag sequence, the results of the center-of-gravity calculation being utilized during demodulation of the data signal.

21. A method of receiving data transmitted as a narrow band data signal at an unknown frequency within a known range of frequencies, the method comprising the steps of:

receiving the data signal within the known range of frequencies;

dividing at a receiver the range of frequencies into plural frequency bands each of width less that the uncertainty in the transmission frequency of the data signal;

detecting the presence of said data signal in at least one of said frequency bands; and, demodulating the detected data signal, wherein the data signal is transmitted as two sub-channels, the detection and demodulation steps being carried out on each sub-channel, the respective demodulated data signals being weighted and summed according to the quality of the signals determined in the detection step.

22. A method according to claim 21, wherein the received signal includes plural narrow band data signals each occupying a distinct portion of the channel, the receiver receiving said narrow band data signals substantially concurrently.

23. A method according to claim 22, wherein plural demodulation steps are carried out following each detection step.

24. A method according to claim 23, wherein the data signal comprises a data packet following a flag sequence of bits and the detection step detects the existence of the flag sequence.

25. A method according to claim 24, wherein individual narrow frequency bands are compared with a wanted flag signal at regular intervals.

26. A method according to claim 24, wherein the data packet is transmitted between leading and trailing flag sequences, and the detection step requires the detection of both flag sequences.

27. A method according to claim 26, wherein it is required that both the leading and trailing flag sequences are detected to verify the presence of a data packet.

28. A method according to claim 27, wherein the data signal has plural data packets separated from each other by flag sequences.

29. A method according to claim 27, wherein the step of detecting the presence of data signals in individual narrow frequency bands comprises the step of detecting the presence of a flag sequence in plural narrow frequency bands, the amplitude of the flag sequence bits in each band being compared with a normalized value to determine a quality value of the flag sequence bits in each band, the quality values being plotted against frequency and time.

30. A method according to claim 29, wherein a "centre-of-gravity" calculation is performed on the quality values to provide a central frequency and a central time for each flag sequence, the result of the centre-of-gravity calculation being utilised during demodulation of the data signal.

31. A receiver for receiving and demodulating a narrow band data signal transmitted at an unknown frequency within a known range of frequencies, the receiver comprising:

means for dividing the range of frequencies into plural frequency bands each of width less than the uncertainty in the transmission frequency of the data signal;

means for detecting the presence of said data signal in at least one of said frequency bands; and, means for demodulating the detected data signal.

32. A receiver for receiving and demodulating a narrow band data signal transmitted at an unknown frequency within a known range of frequencies, the receiver comprising:

means for dividing the range of frequencies into plural frequency bands each of width less than the uncertainty in the transmission frequency of the data signal;

means for detecting the presence of said data signal in at least one of said frequency bands; and, means for demodulating the detected data signal, and comprising detection and demodulation means for detecting and demodulating data signals transmitted in two sub-channels, and further comprising adding means for weighting and summing the respective demodulated data signals according to the quality of the signals determined in the detection steps.

33. A method according to claim 1, wherein the frequency of each narrow band filter in the demodulation step is determined in the detection step.

34. Apparatus according to claim 16, wherein the said receiver includes an analogue to digital converter (ADC), and said dividing means comprises a Fast Fourier Transform (FFT).

35. Apparatus according to claim 16, wherein the demodulation means comprises a filter arranged to pass only a central frequency determined by said detecting means.

36. Apparatus according to claim 16, wherein said division, said detection, and said demodulation means are provided by a digital signal processor.

37. A method according to claim 20, wherein the demodulating step includes the step of centering at least one narrow band filter on the detected data signal frequency bands.

38. A method according to claim 20, wherein the step of detecting the presence of data signals in at least one of the frequency bands comprises the step of detecting the presence of a data signal in plural narrow frequency bands, the amplitude of the data signal in each band being compared with a normalized value to determine a quality value of the data signal in each band.

39. A receiver according to claim 32, comprising an analogue to digital converter (ADC), and said dividing means comprises a Fast Fourier Transform (FFT).

40. A receiver according to claim 32, wherein the demodulation means comprises a filter arranged to pass only a central frequency determined by said detecting means.

41. A receiver according to claim 32, wherein said division, said detection, and said demodulation means are provided by a digital signal processor.

42. A method according to claim 37, wherein the frequency of the narrow band filter in the demodulating step is determined in the detecting step.

43. A method according to claim 37, wherein detection time of the data signal in the narrow band frequency is determined in the detecting step and used in demodulating step.

* * * * *